US010072865B2

(12) United States Patent
Bushmeyer et al.

(10) Patent No.: US 10,072,865 B2
(45) Date of Patent: Sep. 11, 2018

(54) SYSTEMS AND METHODS FOR MINIMIZING COMPRESSOR USE IN HVAC SYSTEMS

(71) Applicant: SCHNEIDER ELECTRIC IT CORPORATION, West Kingston, RI (US)

(72) Inventors: Joseph Bushmeyer, Dardenne Prairie, MO (US); John H. Bean, Jr., Defiance, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 102 days.

(21) Appl. No.: 15/098,357

(22) Filed: Apr. 14, 2016

(65) Prior Publication Data

US 2017/0299209 A1    Oct. 19, 2017

(51) Int. Cl.

| G05D 23/00 | (2006.01) |
|---|---|
| G05B 13/00 | (2006.01) |
| F24F 11/30 | (2018.01) |
| F24F 11/70 | (2018.01) |
| F24F 11/62 | (2018.01) |

(Continued)

(52) U.S. Cl.
CPC .......... F24F 11/30 (2018.01); F24F 11/0001 (2013.01); F24F 11/62 (2018.01);
(Continued)

(58) Field of Classification Search
CPC .................................................. F24F 11/0086
(Continued)

(56) References Cited

U.S. PATENT DOCUMENTS 5,276,630 A * 1/1994 Baldwin .................. F24F 11/00
                                                                            700/276
5,816,491 A * 10/1998 Berkeley ............ G05D 23/1923
                                                                            236/46 R (Continued)

FOREIGN PATENT DOCUMENTS

| GB | 2522269 A | 7/2015 |
| WO | 2014059123 A1 | 4/2014 |

OTHER PUBLICATIONS

Monroe, Reliability and Temperature: How Big is the X-Factor?, Nov. 13, 2013, pp. 3.*

(Continued)

Primary Examiner — Suresh Suryawanshi
(74) Attorney, Agent, or Firm — Lando & Anastasi, LLP (57) ABSTRACT

A method of minimizing compressor use in an HVAC system for an IT space includes configuring an HVAC system to cool an IT space, providing a control system to operate the HVAC system, the control system having software configured to calculate economization mode minimum achievable X-Factor for a predetermined period of time, providing at least one parameter to the control system, the at least one parameter including X-Factor history and period weather forecast(s), setting temperature set points for each forecast interval, and analyzing the temperature set points according to maximum and minimum temperature parameters for the IT space, with intervals with set points violating the maximum temperature parameter being designated as intervals for which the compressor will operate while intervals with set points violating the minimum temperature parameter are assigned the minimum temperature set point.

20 Claims, 9 Drawing Sheets

(51) Int. Cl.
*F24F 11/00* (2018.01)
*G05B 15/02* (2006.01)
*F24F 110/12* (2018.01)
*F24F 11/64* (2018.01)
*F24F 130/10* (2018.01)
*F24F 11/46* (2018.01)
*F24F 140/60* (2018.01)
*F24F 130/00* (2018.01)
*F24F 12/00* (2006.01)

(52) U.S. Cl.
CPC ............. *F24F 11/70* (2018.01); *G05B 15/02* (2013.01); *F24F 11/46* (2018.01); *F24F 11/64* (2018.01); *F24F 12/003* (2013.01); *F24F 12/006* (2013.01); *F24F 2011/0002* (2013.01); *F24F 2011/0006* (2013.01); *F24F 2110/12* (2018.01); *F24F 2130/00* (2018.01); *F24F 2130/10* (2018.01); *F24F 2140/60* (2018.01); *Y02B 30/563* (2013.01)

(58) Field of Classification Search
USPC ........................................................ 700/276
See application file for complete search history.

(56) References Cited

U.S. PATENT DOCUMENTS

| | | | | |
|---|---|---|---|---|
| 6,016,710 | A * | 1/2000 | Boles | F24F 3/1423 73/861.42 |
| 7,933,743 | B2 * | 4/2011 | Golani | H04L 43/00 702/183 |
| 8,515,584 | B2 * | 8/2013 | Miller | F24F 11/006 700/276 |
| 8,583,289 | B2 * | 11/2013 | Stack | F24F 11/30 700/278 |
| 9,435,557 | B2 * | 9/2016 | Albrecht | F24F 11/0001 |
| 9,816,733 | B2 * | 11/2017 | Haley | F25B 7/00 |
| 2013/0324027 | A1 * | 12/2013 | Davis | F24F 11/0001 454/258 |

OTHER PUBLICATIONS

ASHRAE, 2011 Thermal Guidelines for Data Processing Environments—Expanded Data Center Classes and Usage Guidance, 2011, ASHRAE, pp. 45.*
Beaty et al, Airside Economizers In Data Centers, Jan. 2015, AHRAE Journal, pp. 6.*
Greenberg et al, Best Practices for Data Centers: Lessons Learned from Benchmarking 22 Data Centers, 2006, ACEEE, pp. 12.*
Sunbird, How to Safely Avoid Overcooling Your Data Center and Save Money Today, 2013, Sunbird, pp. 17.*
Iyengar et al, Reducing Energy Usage in Data Centers Through Control of Room Air Conditioning Units, 2010, IEEE, pp. 11.*
GMK, Server Reliability and Outside Air Cooling, Jul. 11, 2011, pp. 1.*
Beaty, Donald L, "X-Factor Explained," Column Data Centers, Nov. 2014, Ashrae Journal, pp. 83-85.
Extended European Search Report from corresponding European Application No. 17163694.7 dated Aug. 18, 2017.

* cited by examiner

| Outdoor Temperature | Supply Temperature | Interval X-Factor | DX Enabled |
|---|---|---|---|
| 86.0° F | 68.0° F | 1.000 | 1 |
| 86.0° F | 68.0° F | 1.000 | 1 |
| 85.0° F | 68.0° F | 1.000 | 1 |
| 83.0° F | 68.0° F | 1.000 | 1 |
| 79.0° F | 68.0° F | 1.000 | 1 |
| 76.0° F | 68.0° F | 1.000 | 1 |
| 74.0° F | 68.0° F | 1.000 | 1 |
| 72.0° F | 68.0° F | 1.000 | 1 |
| 73.0° F | 68.0° F | 1.000 | 1 |
| 72.0° F | 68.0° F | 1.000 | 1 |
| 71.0° F | 68.0° F | 1.000 | 1 |
| 70.0° F | 68.0° F | 1.000 | 1 |
| 69.0° F | 68.0° F | 1.000 | 1 |
| 69.0° F | 68.0° F | 1.000 | 1 |
| 68.0° F | 68.0° F | 1.000 | 1 |
| 67.0° F | 68.0° F | 1.000 | 1 |
| 68.0° F | 68.0° F | 1.000 | 1 |
| 72.0° F | 68.0° F | 1.000 | 1 |
| 76.0° F | 68.0° F | 1.000 | 1 |
| 79.0° F | 68.0° F | 1.000 | 1 |
| 82.0° F | 68.0° F | 1.000 | 1 |
| 84.0° F | 68.0° F | 1.000 | 1 |
| 86.0° F | 68.0° F | 1.000 | 1 |
| 87.0° F | 68.0° F | 1.000 | 1 |

Total Economizer Hours: 0

Actual X-Factor: 1

FIG. 3

X Factor Regulator

Setpoint: 1

Maximum Allowed Supply Temperature: 82° F
minimum Allowed Supply Temperature: 59° F DX Achievable Supply Temperature: 63° F
Supply/Return Delta Temperature: 25° F

| Outdoor Temperature | Supply Temperature | Interval X-Factor | DX Enabled |
|---|---|---|---|
| 86.0° F | 63.9° F | 0.895 | 1 |
| 86.0° F | 63.9° F | 0.895 | 1 |
| 85.0° F | 63.9° F | 0.895 | 1 |
| 83.0° F | 63.9° F | 0.895 | 1 |
| 79.0° F | 63.9° F | 0.895 | 1 |
| 76.0° F | 63.9° F | 0.895 | 1 |
| 74.0° F | 63.9° F | 0.895 | 1 |
| 72.0° F | 63.9° F | 0.895 | 1 |
| 73.0° F | 63.9° F | 0.895 | 1 |
| 72.0° F | 63.9° F | 0.895 | 1 |
| 71.0° F | 63.9° F | 0.895 | 1 |
| 70.0° F | 81.1° F | 1.342 | |
| 69.0° F | 80.4° F | 1.325 | |
| 69.0° F | 80.4° F | 1.325 | |
| 68.0° F | 79.7° F | 1.308 | |
| 67.0° F | 79.0° F | 1.290 | |
| 68.0° F | 79.7° F | 1.308 | |
| 72.0° F | 63.9° F | 0.895 | 1 |
| 76.0° F | 63.9° F | 0.895 | 1 |
| 79.0° F | 63.9° F | 0.895 | 1 |
| 82.0° F | 63.9° F | 0.895 | 1 |
| 84.0° F | 63.9° F | 0.895 | 1 |
| 86.0° F | 63.9° F | 0.895 | 1 |
| 87.0° F | 63.9° F | 0.895 | 1 |

Total Economizer Hours: 6

Actual X-Factor: 1

FIG. 4

X Factor Regulator

Setpoint: 0.95

Maximum Allowed Supply Temperature: 82°F
minimum Allowed Supply Temperature: 59°F DX Achievable Supply Temperature: 63°F
Supply/Return Delta Temperature: 25°F

| Outdoor Temperature | Supply Temperature | Interval X-Factor | DX Enabled |
|---|---|---|---|
| 86.0°F | 63.9°F | 0.879 | 1 |
| 86.0°F | 63.9°F | 0.879 | 1 |
| 85.0°F | 63.9°F | 0.879 | 1 |
| 83.0°F | 63.9°F | 0.879 | 1 |
| 79.0°F | 63.9°F | 0.879 | 1 |
| 76.0°F | 63.9°F | 0.879 | 1 |
| 74.0°F | 63.9°F | 0.879 | 1 |
| 72.0°F | 63.9°F | 0.879 | 1 |
| 73.0°F | 63.9°F | 0.879 | 1 |
| 72.0°F | 63.9°F | 0.879 | 1 |
| 71.0°F | 63.9°F | 0.879 | 1 |
| 70.0°F | 63.9°F | 0.879 | 1 |
| 69.0°F | 63.9°F | 0.879 | 1 |
| 69.0°F | 80.4°F | 1.325 | |
| 68.0°F | 79.7°F | 1.308 | |
| 67.0°F | 79.0°F | 1.290 | |
| 68.0°F | 79.7°F | 1.308 | |
| 72.0°F | 63.9°F | 0.879 | 1 |
| 76.0°F | 63.9°F | 0.879 | 1 |
| 79.0°F | 63.9°F | 0.879 | 1 |
| 82.0°F | 63.9°F | 0.879 | 1 |
| 84.0°F | 63.9°F | 0.879 | 1 |
| 86.0°F | 63.9°F | 0.879 | 1 |
| 87.0°F | 63.9°F | 0.879 | 1 |

Total Economizer Hours: 4

Actual X-Factor: 0.95

FIG. 5

| Outdoor Temperature | Supply Temperature | Interval X-Factor | DX Enabled |
|---|---|---|---|
| 67.0°F | 68.0°F | 1.000 | 1 |
| 67.0°F | 68.0°F | 1.000 | 1 |
| 66.4°F | 68.0°F | 1.000 | 1 |
| 64.0°F | 68.0°F | 1.000 | 1 |
| 61.0°F | 68.0°F | 1.000 | 1 |
| 59.0°F | 68.0°F | 1.000 | 1 |
| 58.0°F | 68.0°F | 1.000 | 1 |
| 58.0°F | 68.0°F | 1.000 | 1 |
| 57.0°F | 68.0°F | 1.000 | 1 |
| 56.0°F | 68.0°F | 1.000 | 1 |
| 55.0°F | 68.0°F | 1.000 | 1 |
| 55.0°F | 68.0°F | 1.000 | 1 |
| 54.0°F | 68.0°F | 1.000 | 1 |
| 54.0°F | 68.0°F | 1.000 | 1 |
| 54.0°F | 68.0°F | 1.000 | 1 |
| 54.0°F | 68.0°F | 1.000 | 1 |
| 55.0°F | 68.0°F | 1.000 | 1 |
| 56.0°F | 68.0°F | 1.000 | 1 |
| 57.0°F | 68.0°F | 1.000 | 1 |
| 58.0°F | 68.0°F | 1.000 | 1 |
| 60.0°F | 68.0°F | 1.000 | 1 |
| 61.0°F | 68.0°F | 1.000 | 1 |
| 61.0°F | 68.0°F | 1.000 | 1 |
| 61.0°F | 68.0°F | 1.000 | 1 |

Total Economizer Hours: 0

Actual X-Factor: 1

FIG. 6

X Factor Regulator

Setpoint: 1

Maximum Allowed Supply Temperature: 82° F
minimum Allowed Supply Temperature: 59° F DX Achievable Supply Temperature: 63° F
Supply/Return Delta Temperature: 25° F

| Outdoor Temperature | Supply Temperature | Interval X-Factor | DX Enabled |
|---|---|---|---|
| 67.0° F | 63.6° F | 0.885 | 1 |
| 67.0° F | 63.6° F | 0.885 | 1 |
| 66.4° F | 63.6° F | 0.885 | 1 |
| 64.0° F | 63.6° F | 0.885 | 1 |
| 61.0° F | 63.6° F | 0.885 | 1 |
| 59.0° F | 63.6° F | 0.885 | 1 |
| 58.0° F | 63.6° F | 0.885 | 1 |
| 58.0° F | 72.7° F | 1.145 | |
| 57.0° F | 72.0° F | 1.130 | |
| 56.0° F | 71.3° F | 1.107 | |
| 55.0° F | 70.6° F | 1.085 | |
| 55.0° F | 70.6° F | 1.085 | |
| 54.0° F | 69.9° F | 1.062 | |
| 54.0° F | 69.9° F | 1.062 | |
| 54.0° F | 69.9° F | 1.062 | |
| 54.0° F | 69.9° F | 1.062 | |
| 55.0° F | 70.6° F | 1.085 | |
| 56.0° F | 71.3° F | 1.107 | |
| 57.0° F | 72.0° F | 1.130 | |
| 58.0° F | 72.7° F | 1.145 | |
| 60.0° F | 63.6° F | 0.885 | 1 |
| 61.0° F | 63.6° F | 0.885 | 1 |
| 61.0° F | 63.6° F | 0.885 | 1 |
| 61.0° F | 63.6° F | 0.885 | 1 |

Total Economizer Hours: 13

Actual X-Factor: 1

FIG. 7

X Factor Regulator

Setpoint: 0.95

Maximum Allowed Supply Temperature: 82° F
minimum Allowed Supply Temperature: 59° F DX Achievable Supply Temperature: 63° F
Supply/Return Delta Temperature: 25° F

| Outdoor Temperature | Supply Temperature | Interval X-Factor | DX Enabled |
|---|---|---|---|
| 67.0° F | 63.1° F | 0.872 | 1 |
| 67.0° F | 63.1° F | 0.872 | 1 |
| 66.4° F | 63.1° F | 0.872 | 1 |
| 64.0° F | 63.1° F | 0.872 | 1 |
| 61.0° F | 63.1° F | 0.872 | 1 |
| 59.0° F | 63.1° F | 0.872 | 1 |
| 58.0° F | 63.1° F | 0.872 | 1 |
| 58.0° F | 63.1° F | 0.872 | 1 |
| 57.0° F | 63.1° F | 0.872 | 1 |
| 56.0° F | 71.3° F | 1.107 | |
| 55.0° F | 70.6° F | 1.085 | |
| 55.0° F | 70.6° F | 1.085 | |
| 54.0° F | 69.9° F | 1.062 | |
| 54.0° F | 69.9° F | 1.062 | |
| 54.0° F | 69.9° F | 1.062 | |
| 54.0° F | 69.9° F | 1.062 | |
| 55.0° F | 70.6° F | 1.085 | |
| 56.0° F | 71.3° F | 1.107 | |
| 57.0° F | 63.9° F | 0.872 | 1 |
| 58.0° F | 63.9° F | 0.872 | 1 |
| 60.0° F | 63.9° F | 0.872 | 1 |
| 61.0° F | 63.9° F | 0.872 | 1 |
| 61.0° F | 63.9° F | 0.872 | 1 |
| 61.0° F | 63.9° F | 0.872 | 1 |

Total Economizer Hours: 9

Actual X-Factor: 0.95

SYSTEMS AND METHODS FOR MINIMIZING COMPRESSOR USE IN HVAC SYSTEMS

FIELD OF THE DISCLOSURE

This disclosure relates to cooling systems, and particularly to systems and methods directed toward minimizing compressor use in heating, ventilation and air conditioning ("HVAC") systems.

BACKGROUND OF THE DISCLOSURE

Cooling consumes a large part of energy expenditures for data centers. The goal of conserving energy creates a need to allocate cooling within a data center as efficiently as possible. Today, the use of economizers in the cooling of IT spaces is limited to times where outside weather conditions allow the HVAC system to bring the temperature of the IT space down to a static temperature set point of the space, which may be set at 68° F. (20° C.). The function of an economizer in an HVAC system is to "economize" or save on the cost of cooling a space. Because operating a compressor is so energy intensive, the ability to cool an indoor space without running the compressor can provide significant cost savings. Unfortunately, an economizer can only be used when the outdoor temperature and humidity is low enough that the HVAC system can supply air to the space at or near the system's temperature set point.

IT spaces, for the most part, are cooled to a static set point. As mentioned above, a typical temperature set point for an IT space is at or near 68° F. (20° C.). Keeping IT equipment at this temperature over the course of its life, according to the American Society of Heating, Refrigerating and Air-Conditioning Engineers (ASHRAE), keeps the rate of IT equipment failure at a "baseline" level. For HVAC engineers, this means that an economizer, in today's systems, can only be utilized when the outdoor conditions allow the system to achieve a temperature at or about the 68° F. (20° C.) set point. Thus, for many temperate climates, economizer usage is, at worst, seasonal and, at best, sparse during spring, summer and fall months.

SUMMARY OF THE DISCLOSURE

One aspect of the disclosure is directed to a method of minimizing compressor use in an HVAC system for an IT space. In one embodiment, the method comprises: configuring an HVAC system to cool an IT space; providing a control system to operate the HVAC system, the control system having software configured to forecast economization mode minimum achievable X-Factor for a future portion of a predetermined period of time along with tracking cumulative X-Factor for a past period of the predetermined period of time, thereby identifying future time that must be augmented with compressor operation to achieve user selected X-Factor in aggregate over the period of time, the predetermined period of time having user selected start date, which may be in the past, and user selected duration having an end date in the future; providing at least one parameter to the control system, the at least one parameter including X-Factor history and period weather forecast(s); setting temperature set points for each forecast interval; and analyzing the temperature set points according to maximum and minimum temperature parameters for the IT space, with intervals with set points violating the maximum temperature parameter being designated as intervals for which the compressor will operate while intervals with set points violating the minimum temperature parameter are assigned the minimum temperature set point.

Embodiments of the disclosure further may include continuously monitoring and reporting measured parameters to the software of the control system. Once minimum and maximum parameters have been satisfied, the system may calculate the X-Factor for the period, using historic temperatures of the IT space if they exist, and should this X-Factor not be achievable after this adjustment, the interval with the highest temperature set point may be added to the group of intervals which will operate the compressor and the adjustment attempted again. If the X-Factor requires upward adjustment, the software may adjust the temperature of the economizing intervals upward, starting with the interval with the coldest temperature set point until the X-Factor set point is achieved. The HVAC system may be controlled using prior economizing methods that are unable to operate with its compressor(s) idle for even a brief time period on either day. The HVAC system may be able to idle its compressor(s) for significant time periods on both days while supporting the same level or better of equipment reliability. The at least one parameter further may include configuring the software of the control system to make smarter decisions about how "hard" to drive compressor(s) to make up for the warmer supply temperatures during certain economization periods. The software may include metrics to bias operation towards fewer economization periods in order to save energy during DX operation. Information about peak demand electricity costs versus off-peak demand costs may inform the software to refine operating profiles according to actual cost of energy. An addition of an automatic seasonal shift in reliability factor may enable further energy savings by essentially capturing cheaper X-Factor offsets in winter months and applying them to more expensive summer months. The method further may include setting the X-Factor. The IT space may include a plurality of equipment racks configured to support electronic equipment, and the HVAC system may include thermistors secured to plurality of equipment racks, which result in airflow measurements being tolerant of dispersed IT populations, highly-variable IT airflow rates, and airflow direction.

Another aspect of the disclosure is directed to a system to minimize compressor use in an HVAC system for an IT space. In one embodiment, the system comprises an HVAC system configured to cool an IT space, and a control system coupled to components of the HVAC system to operate the HVAC system, the control system having software configured to forecast economization mode minimum achievable X-Factor for a future portion of a predetermined period of time along with tracking cumulative X-Factor for a past period of the predetermined period of time, thereby identifying future time that must be augmented with compressor operation to achieve user selected X-Factor in aggregate over the period of time, the predetermined period of time having user selected start date, which may be in the past, and user selected duration having an end date in the future. The control system is configured to set an X-Factor, receive at least one parameter, the at least one parameter including X-Factor history and period weather forecast(s), set temperature set points for each forecast interval, and analyze the temperature set points and normalizing the set points according to maximum and minimum temperature parameters for the IT space, with intervals with set points violating the maximum temperature parameter being designated as intervals for which the compressor will operate while intervals with set points violating the minimum temperature parameter are assigned the minimum temperature set point.

Embodiments of the system further may include continuously monitoring and reporting measured parameters to the software of the control system, the measure parameters including at least one of temperature, power consumption, and HVAC system specification data. Once minimum and maximum parameters have been satisfied, the system may calculate the X-Factor for the period, using historic temperatures of the IT space if they exist, and should this X-Factor not be achievable after this adjustment, the interval with the highest temperature set point is added to the group of intervals which will operate the compressor and the adjustment attempted again, and if the X-Factor requires upward adjustment, the software may adjust the temperature of the economizing intervals upward, starting with the interval with the coldest temperature set point until the X-Factor set point is achieved. The HVAC system may be controlled using prior economizing methods that are unable to operate with its compressor(s) idle for even a brief time period on either day, the HVAC system being able to idle its compressor(s) for significant time periods on both days while supporting the same level or better of equipment reliability. The at least one parameter further may include configuring the software of the control system to make smarter decisions about how "hard" to drive compressor(s) to make up for the warmer supply temperatures during certain economization periods. The software may include metrics to bias operation towards fewer economization periods in order to save energy during DX operation. Information about peak demand electricity costs versus off-peak demand costs may inform the software to refine operating profiles according to actual cost of energy. An addition of an automatic seasonal shift in reliability factor may enable further energy savings by essentially capturing cheaper X-Factor offsets in winter months and applying them to more expensive summer months.

BRIEF DESCRIPTION OF THE FIGURES

The accompanying figures are not intended to be drawn to scale. In the figures, each identical or nearly identical component that is illustrated in various figures is represented by a like numeral. For purposes of clarity, not every component may be labeled in every figure. In the figures.

DETAILED DESCRIPTION OF THE DISCLOSURE

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. In addition, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As mentioned above, an economizer in an HVAC system is designed to "economize" or save on the cost of cooling a space while maintaining the electronic equipment at an operating temperature suitable for preserving the life of the electronic equipment. In an economizer mode, the compressor function is fully or partially eliminated, eliminating or reducing its energy use. The compressor is used to move heat from within the data center to the outdoor environment when the outdoor temperature is greater than the data center temperature. However, when the outdoor temperature is sufficiently below the data center temperature, the heat will naturally flow to the outside without the need of the "temperature boost" provided by the compressor, so its function is unnecessary. Therefore, under favorable conditions, compressor operation can be reduced or eliminated, saving significant energy. Furthermore, for systems using evaporative assist, that function can also be reduced or eliminated if conditions are favorable, saving water.

Figure 1:
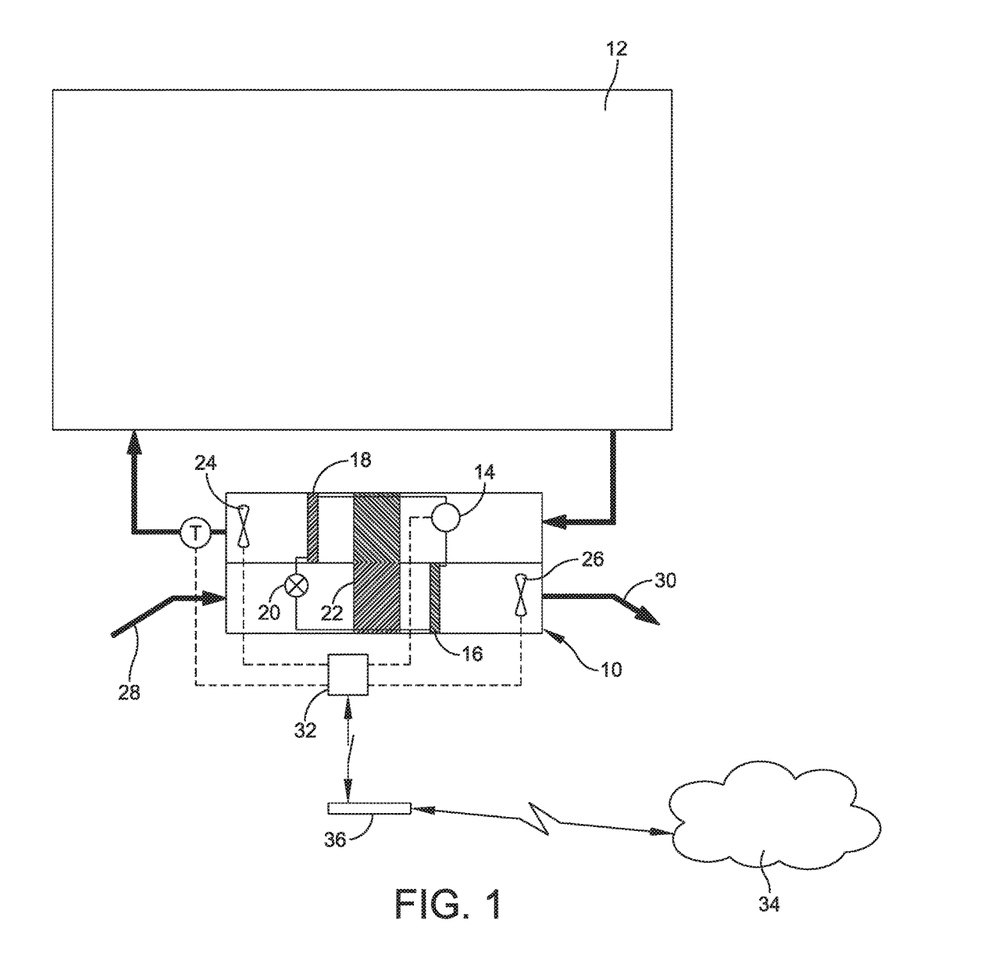
FIG. 1 is a schematic view of an HVAC system of an embodiment of the present disclosure that used to heat and cool a data center.

Referring to the drawings, and more particularly to FIG. 1, an HVAC system is generally indicated at 10. As shown, the HVAC system 10 is configured to treat the air within a space 12 containing, for example, electronic equipment, including closets, equipment rooms and data centers. Such spaces are adapted to house enclosures or racks designed to house networking, telecommunication and other electronic equipment. As discussed in greater detail below, the HVAC system 10 of embodiments of the present disclosure is designed to improve the efficiency and reliability of the entire cooling system by reducing the operating time of a compressor of the HVAC system.

In one embodiment, the HVAC system 10 includes a compressor 14 to deliver coolant under pressure to the components of the HVAC system. The pressurized coolant travels through a discharge pipe, which connects the compressor 14 to a condenser 16. A temperature sensor and a pressure transducer may be provided adjacent to the condenser 16 to measure the temperature and the pressure of the coolant as it enters the condenser. The condenser 16 includes a coil having thermally conductive fins configured to cool the heated coolant within the coil of the condenser. The air flow over the condenser 16 will be discussed in greater detail below.

Once the coolant is cooled within the condenser 16 (e.g., transitioning the coolant from an evaporated state to a condensed state), the coolant travels through another liquid pipe to an evaporator 18. Prior to entering the evaporator 18, the coolant first may travel through a filter drier to eliminate impurities and to remove unwanted non-condensables within the coolant. Once through the filter drier, the coolant travels through a thermal expansion valve 20 to condition the coolant prior to entering the evaporator 18. Once heated by warm air passing over the evaporator 18, the evaporated coolant travels back to the compressor 14 via a section of suction piping. However, prior to entering the compressor 14, the coolant may pass through a compressor suction accumulator, which ensures that coolant enters into the compressor in an evaporated state. Another temperature sensor and another pressure transducer may be provided adjacent to the compressor 14. A condensate pan may be disposed below the evaporator 18 to collect condensate generated by the evaporator. The HVAC system 10 further includes a heat exchanger 22 disposed across the warm indoor airflow path and typically cooler outdoor airflow path. The heat exchanger 22 is positioned to facilitate natural heat flow from the warmer indoor air into the relatively cooler outdoor air. This natural heat exchange process further may be enhanced by either indirect evaporation of water on the outdoor heat exchanger surface and/or adiabatic cooling of the outdoor air prior to contact with the heat exchanger 22.

The arrangement is such that high temperature coolant flows from the compressor 14 to the condenser 16. Pressure and temperature readings of the coolant are taken prior to the coolant entering the condenser 16. The condenser 16 cools the coolant by virtue of relatively cool air passing over the condenser coil. Once cooled, the coolant travels to the evaporator 18. The HVAC system 10 further includes an indoor fan 24 configured to direct air over the heat exchanger 22 disposed between the condenser 16 and the evaporator 18 and an outdoor fan 26 positioned to discharge warm air. As shown, relatively cool air taken from an outdoor air intake 28 is directed to the heat exchanger 22 by the indoor fan 24. As the relatively cool air travels over the heat exchanger 22, the air is heated and exhausted from the HVAC system 10 through an outdoor air discharge 30 by the outdoor fan 26.

In a certain embodiment, the HVAC system 10 further may include a bypass valve to divert coolant normally directed to the condenser 16 from the compressor 14 to the evaporator 18 via another discharge pipe. By opening the bypass valve by means of a stepper motor provided with the bypass valve, for example, a portion of coolant traveling to the condenser 16 is diverted to the evaporator 18 through a bypass discharge pipe. The operation of the bypass valve, which may sometimes be referred to as a hot gas bypass valve, may be manipulated to regulate the capacity of the HVAC system 10. By closely monitoring the pressure and/or temperature of the coolant entering into the condenser 16, the efficiency of the HVAC system 10 further may be optimized by bypassing coolant that travels from the condenser 16 to the evaporator 18.

The HVAC system 10 further includes a control system 32 to control the operation of the HVAC system as well as provide communication with external devices. In one embodiment, the control system 32 may be provided as part of the HVAC system 10 or as a separate component to the HVAC system. In one such embodiment, the control system 32 may communicate with a data center computer system associated with the space 12 to provide status of the components of the HVAC system, and to receive control commands from a Building Management System (BMS). In one particular embodiment, the control system 32 communicates with the data center computer system over a network, and in one such embodiment, the BMS may be implemented using an integrated data center control and monitoring system, such as the InfraStruXure™ data center manager sold by American Power Conversion Corporation of West Kingston, R.I., the assignee of the present disclosure. Notwithstanding the particular configuration, the control system 32 is adapted to control the flow of coolant from the compressor 14 to the condenser 16 and the evaporator 18 depending on the temperature and pressure readings of the HVAC system 10. The control system 32 is further configured to control the operation of the indoor fan 24 and the outdoor fan 26 to control the flow of air over the heat exchanger 22. As shown, the control system 10 is configured to receive weather reports from a cloud weather service 34 via a gateway 36.

Recently, a new metric of equipment reliability, established by ASHRAE as "X-Factor," was established as a dimensionless value of relative server failure rate versus ambient inlet temperature. Significant to the goal of increasing economization usage, X-Factor is measured on a time-weighted basis. For example, IT equipment operated at a temperature of 72.5° F. for 12 hours of the day and then, operated at 63.5° F. for the remaining 12 hours, has an expected reliability that is equivalent to operation in a 68° F. environment for the entire 24-hour period. In this example, a target temperature for the economizer goes from 68° F. to 72.5° F. for half the day without any effect on equipment reliability.

In order to control the X-factor for a period of time, the control system 32 of embodiments of the present disclosure is configured to record past outdoor temperatures in which the HVAC system 10 operates and to predict future temperatures based on weather forecasts provided by the weather service 34. Specifically, the systems and methods of the present disclosure utilize weather forecast data, along with IT space temperature logs, to dynamically adjust an air temperature of the space 12 in order to achieve a programmed reliability X-Factor over a period of time. The control system 32 is coupled to components of the HVAC system 10, e.g., thermometers, to operate the HVAC system. The control system has software configured to forecast economization mode minimum achievable X-Factor for a future portion of a predetermined period of time along with tracking cumulative X-Factor for a past period of the predetermined period of time, thereby identifying future time that must be augmented with compressor operation to achieve user selected X-Factor in aggregate over the period of time. The predetermined period of time has user selected start date, which may be in the past, and user selected duration having an end date in the future.

In one embodiment, the HVAC system 10 is configured to dynamically move the set point of the space 12 over a period of time (higher at times, lower at times) in order to maximize use of the economizer of the HVAC system without affecting the reliability of the IT equipment contained within the space. The control system 32 is configured to reduce energy consumption of the HVAC system 10 by bringing the operating time of at least one compressor, e.g., compressor 14, of the HVAC system down to the theoretical minimum. In a certain embodiment, the control system 32 is configured to schedule HVAC temperature set points over a defined period of time. Utilizing weather data from weather service 34 and logged environmental data from the space 12, the control system 32 balances intervals of warmer and colder operation in order to maximize the use of the economizer while maintaining the reliability of the IT equipment.

In a certain embodiment, the control system 32 looks at the weather forecast for the upcoming period, and determines what X-Factor can be achievable through the exclusive use of the economizer. Next, should economization not provide enough cooling to meet user requirements for the space 12, the software of the control system 32 will iteratively begin to add sub-periods where the compressor 14 will be utilized until user-specified X-Factor is achieved. At each sub-period, the updated history and weather data are re-evaluated to assess any needed adjustments to temperature set point for the upcoming sub-periods. At the end of the period, the method restarts and calculates set points for the new period.

Figure 2:
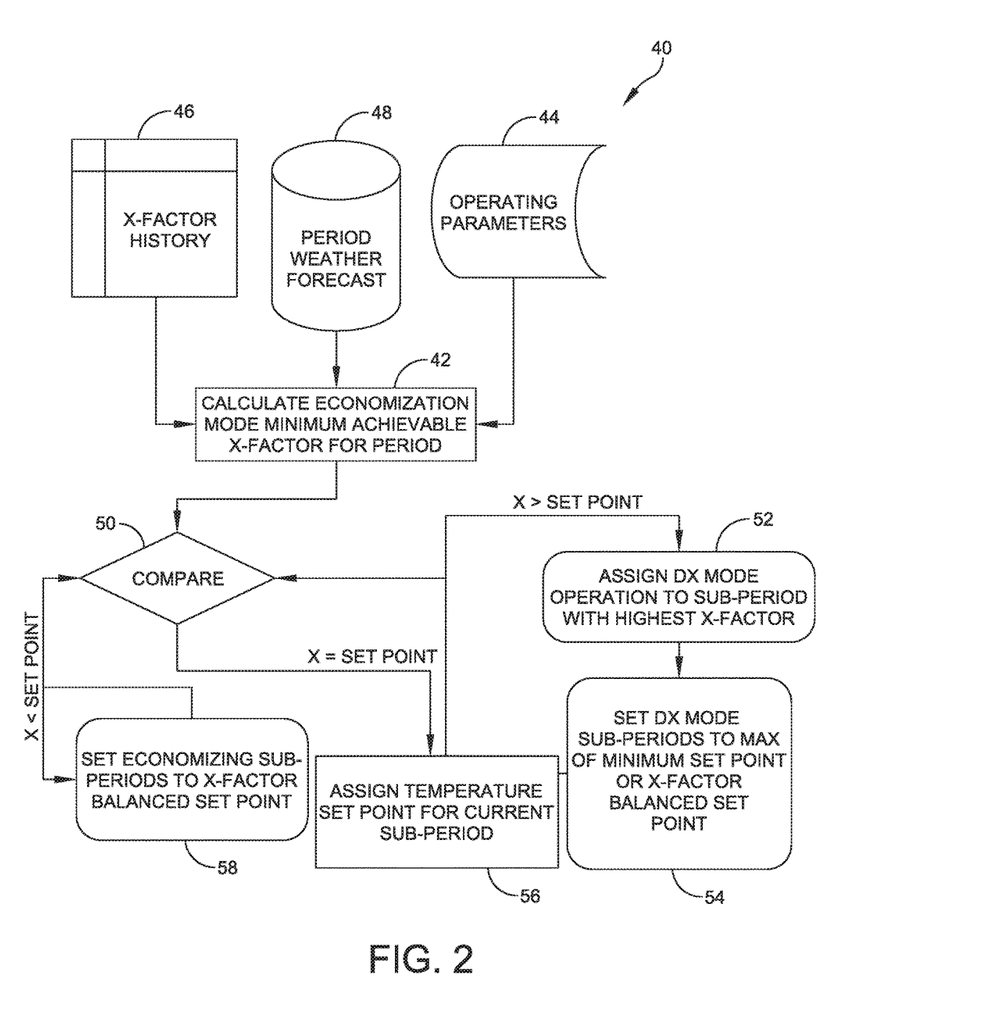
FIG. 2 is a method of an embodiment of the present disclosure that minimizes compressor use in the HVAC system.

As mentioned above, the HVAC system 10 is configured with an economizer to "economize" or save on the cost of cooling a space. In one embodiment, the economizer operation control is embedded within the software of the control system 32. Because operating the compressor 14 is so energy intensive, the ability to cool an indoor space, such as space 12, without running the compressor can provide significant cost savings. Referring to FIG. 2, a method, generally indicated at 40, of minimizing use of the compressor 14 in an HVAC system 10 is shown and described. During operation, the method includes, at 42, calculating an economization mode minimum achievable X-Factor for a period of time by the control system 32. In one embodiment, the control system 32 is configured with operating parameters at 44 and to receive X-Factor history at 46. The control system 32 periodically retrieves weather forecast data at 48 from the weather service 34, and schedules temperature set points for each of the forecast intervals according to the coldest environment that the economizer can create.

Next, the software of the control system 32 analyzes and compares the temperature set points and normalizes them according to maximum and minimum temperature parameters for the space 12. Intervals with set points violating the maximum temperature parameter are designated as intervals for which the compressor 14 will operate while intervals with set points violating the minimum temperature parameter are assigned the minimum temperature set point. Once minimum and maximum parameters have been satisfied, the control system 32 calculates the X-Factor for the period, using historic temperatures of the IT space if they exist.

Once calculated, at 50, the control system 32 compares assigned temperature set point for a current sub-period against a set of economizing sub-periods to the X-factor balanced set point based on feedback received from the HVAC system 10. If the X-Factor is greater than the configured set point, a DX mode of operation is assigned to a sub-period with the highest X-Factor at 52. Once assigned, the DX mode sub-periods are set to maximum of the minimum set point or X-Factor balanced set point at 54. Next, the temperature set point for the current sub-period is assigned at 56. If the X-Factor equals the configured set point, then the assigned temperature set point for the current sub-period is maintained. As shown, the set of economizing sub-periods associated with the X-Factor balanced set point is indicated at 58. These sub-periods are compared against the assigned temperature set point for the current sub-period.

If the X-Factor requires downward adjustment, the software of the control system 32 first determines whether the intervals already utilizing the compressor can be cooled to the minimum temperature set point to achieve the desired X-Factor. Should this X-Factor not be achievable after this adjustment, the interval with the highest temperature set point will be added to a group of intervals which will operate the compressor and the adjustment attempted again. This method iterates until the X-Factor set point is achieved. If the X-Factor requires upward adjustment, the software of the control system 32 will adjust the temperature of the economizing intervals upward, starting with the interval with the coldest temperature set point. The software of the control system will iterate similar to the previous scenario until the X-Factor set point is achieved.

Figure 3:
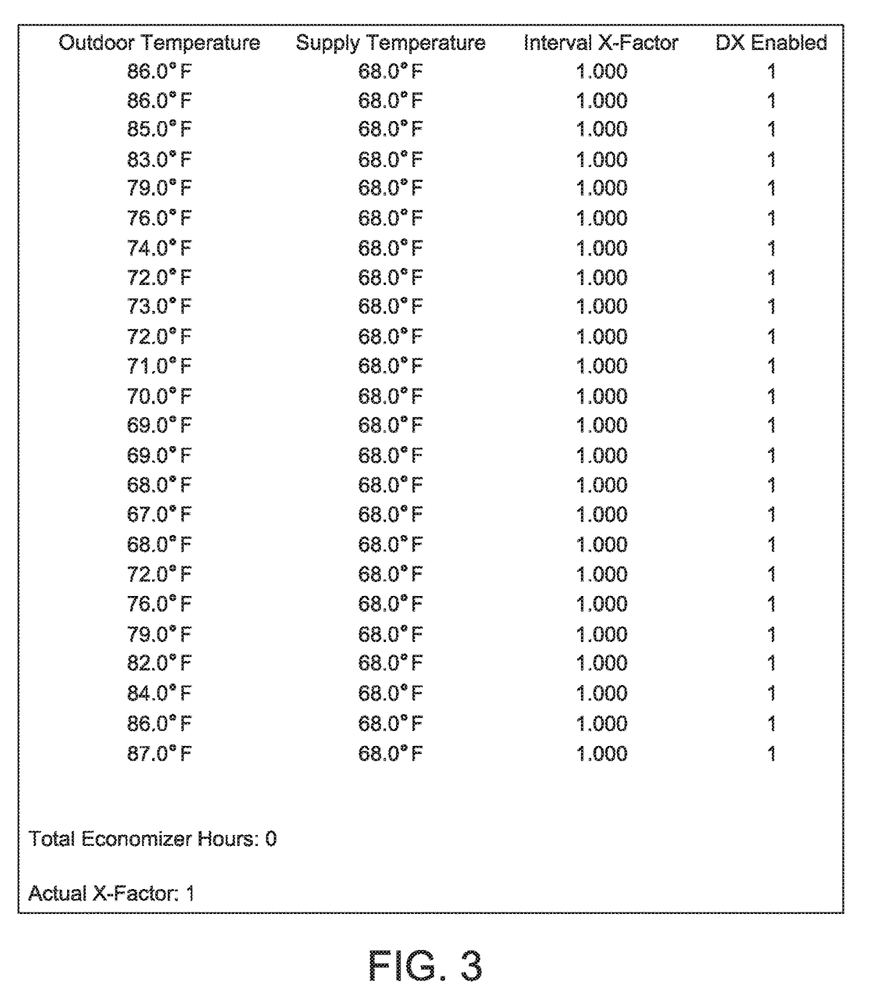
FIGS. 3-5 are exemplary operating profiles on a warm July day using different reliability X-Factors.
Figure 4:
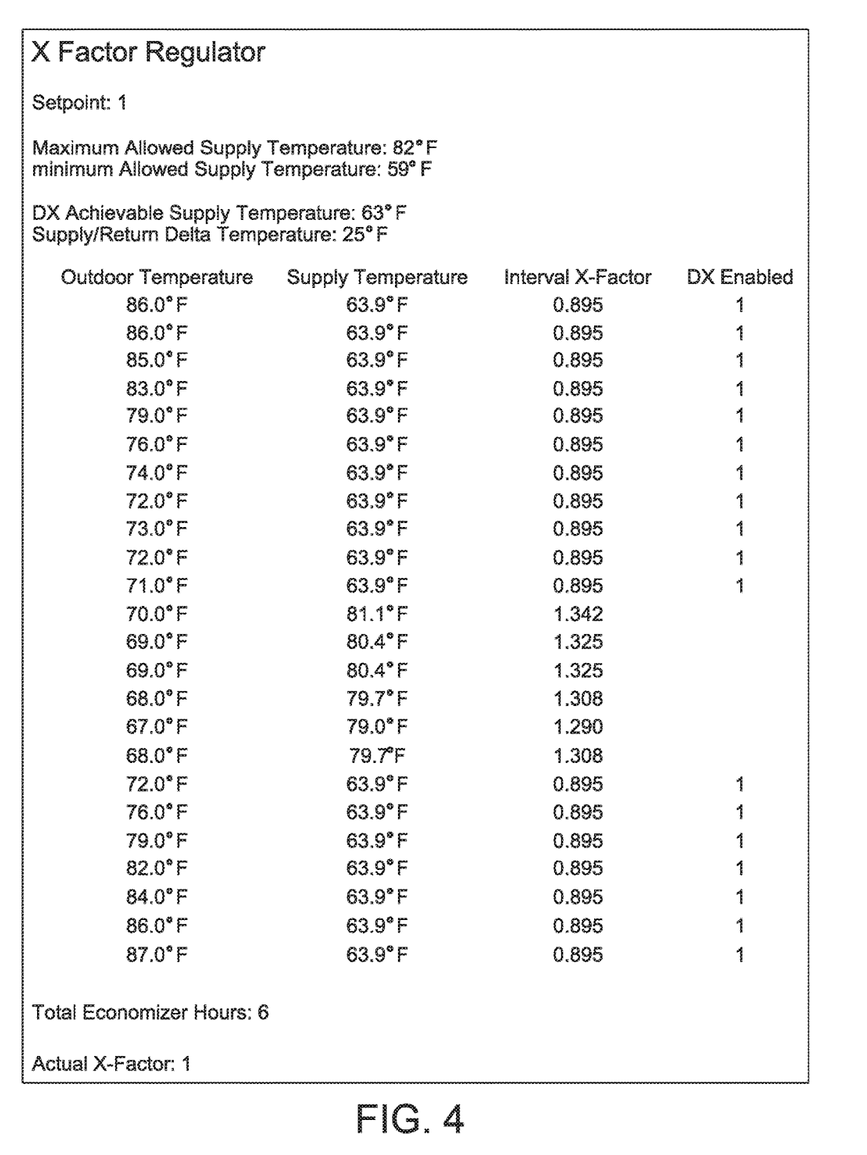
Figure 5:
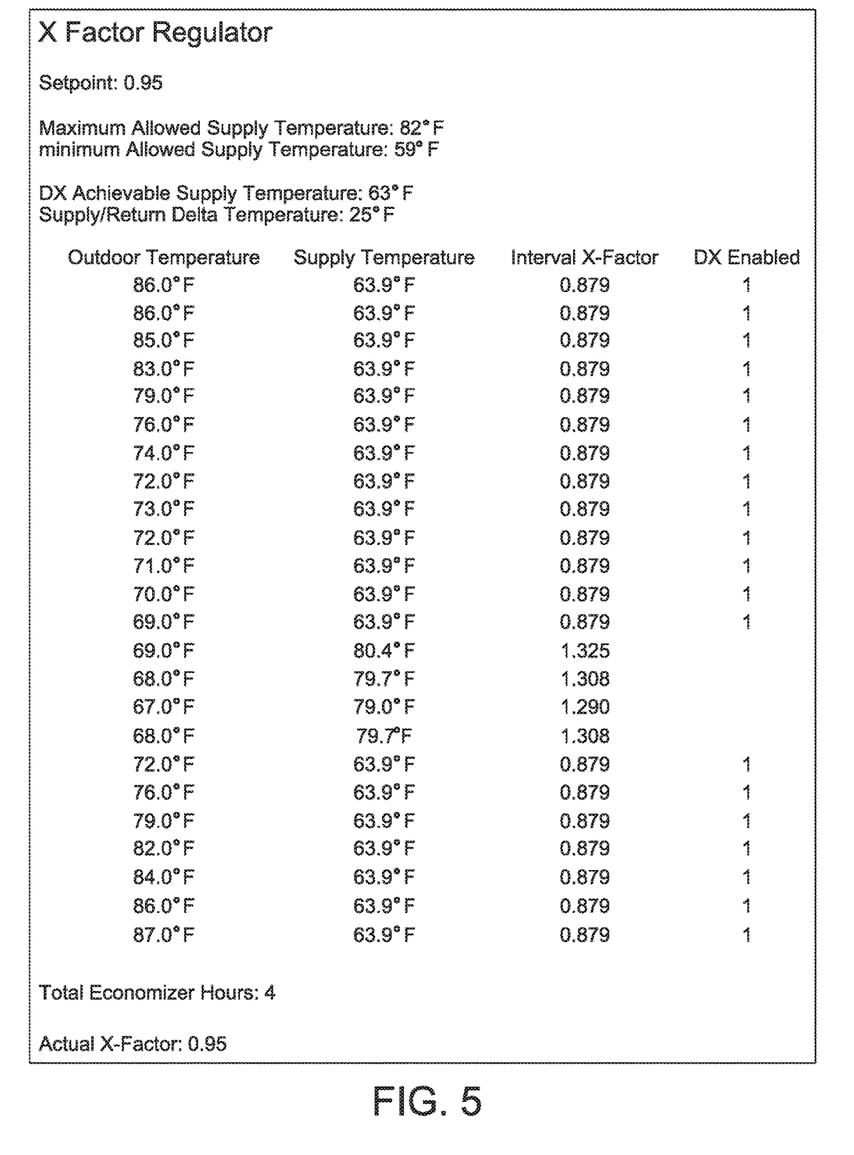

FIG. 3 shows the operating profile of a state of the art system on a warm July day, while FIGS. 4 and 5 show an identical system using our invention on that same day with reliability X-Factors of 1.0 and 0.95.

These operating profiles contrast the weather and system temperatures as well as operating modes of a state of the art system versus a system utilizing direct X-Factor control on an hourly basis for a July day in St. Louis, Mo., for example. The column "Outdoor Temperature" shows a forecasted temperature (identical to real in these examples) for each hour of the day. The column "Supply Temperature" shows an assigned Supply Temperature Set Point (identical to actual in these examples) for each hour of the day. The column "Interval X-Factor" shows an X-Factor that corresponds to that hour's Supply Temperature. The column "DX Enabled" shows the status of the HVAC system's compressor. When a row is marked with a '1,' this means that the compressor is running during the corresponding hour. When a row is blank, this means that the IT space is being cooled with the compressor completely disabled.

FIG. 3 shows that a state of the art system spends the entire day running its compressor. It does this because the system cannot achieve a Supply Temperature of 68° F. (X-Factor 1) without utilizing its compressor. FIG. 4 shows that the same system can disable compressor operation for six hours when directly controlling to an X-Factor set point of 1 (identical reliability factor as state of the art example). Additionally, FIG. 5 shows that this system can disable compressor operation for four hours when directly controlling to an X-Factor set point of 0.95 (superior reliability factor to the state of the art example).

Figure 6:
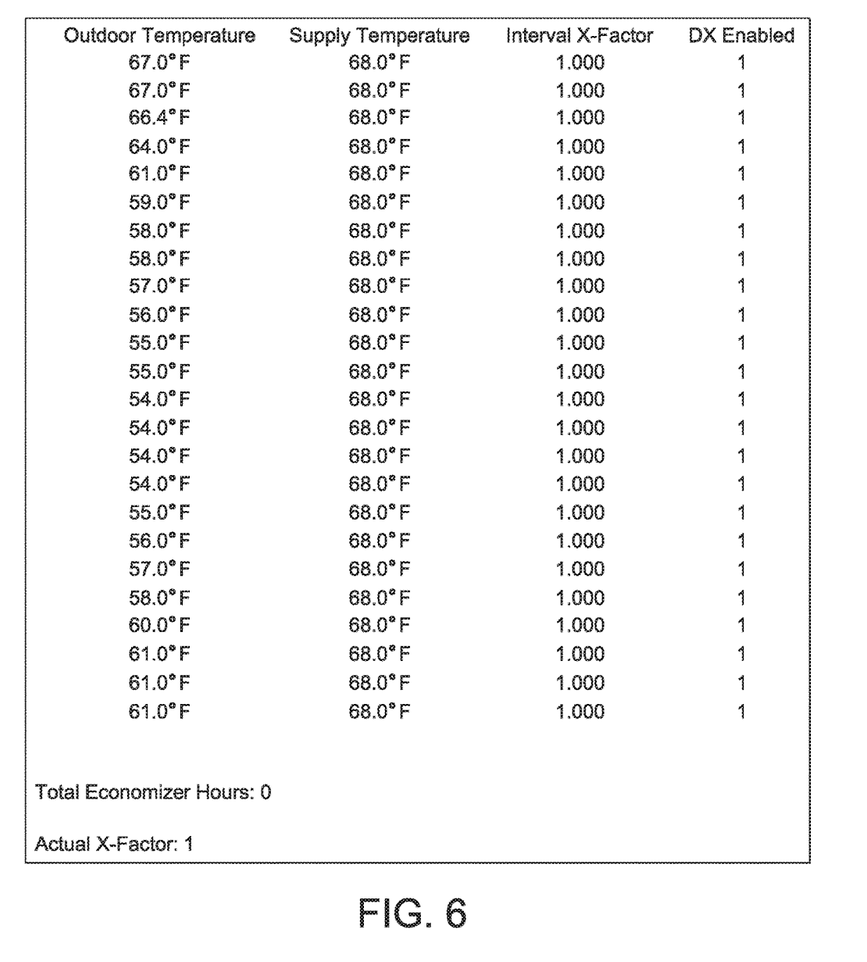
FIGS. 6-8 are exemplary operating profiles on a relatively cooler October day using different reliability X-Factors.
Figure 7:
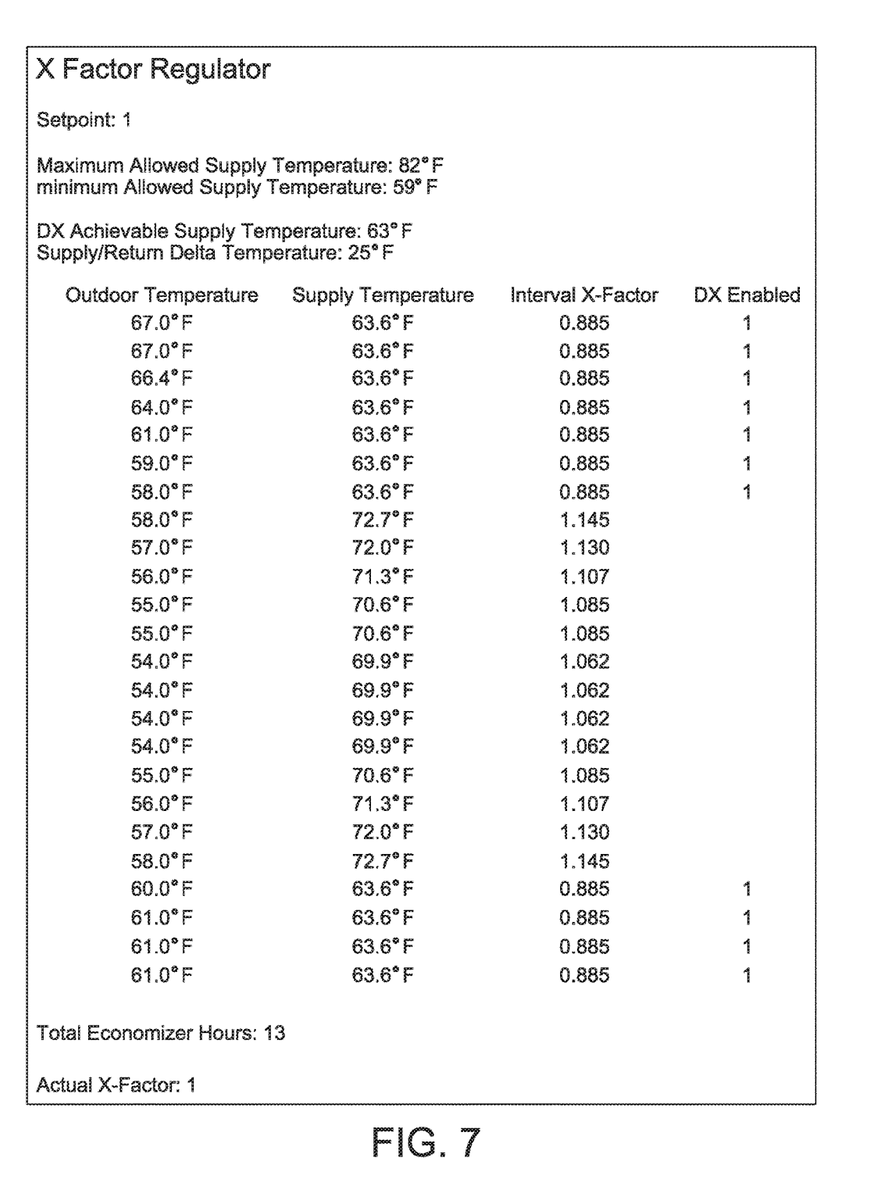
Figure 8:
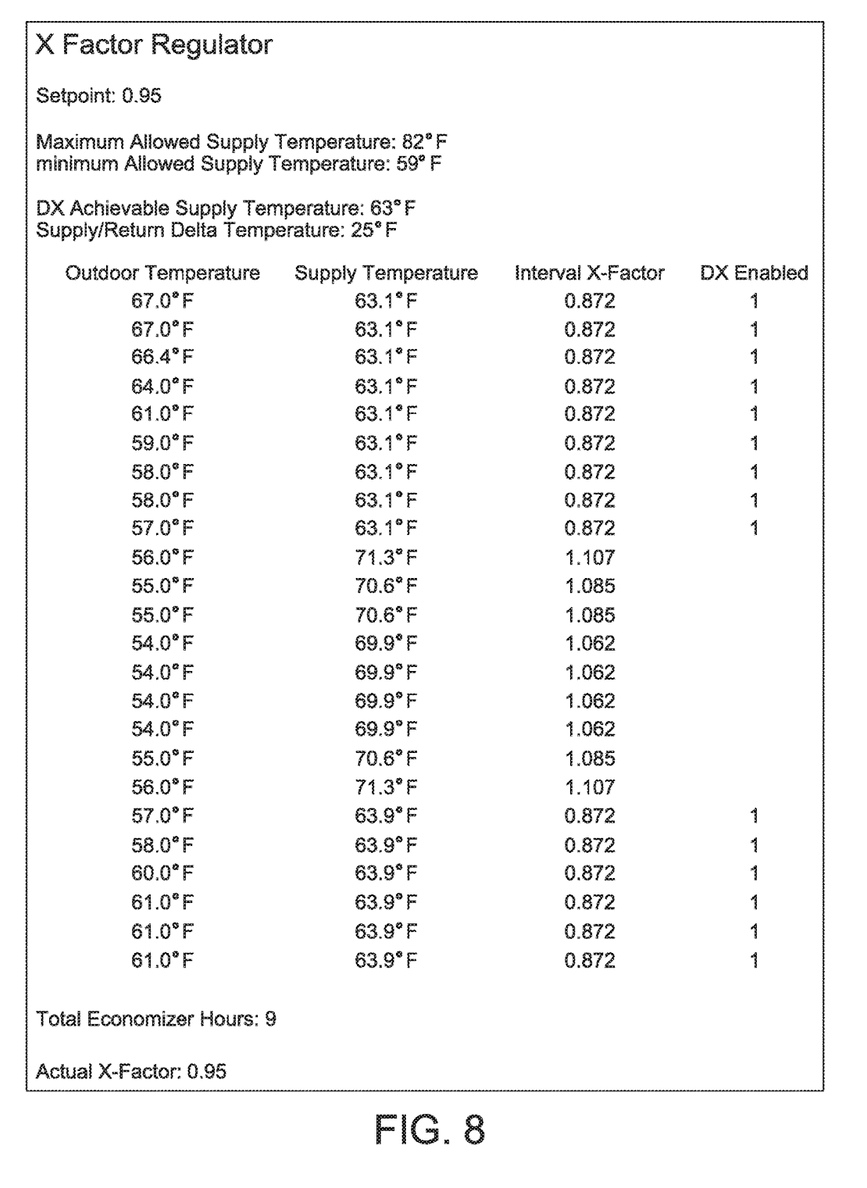

FIG. 6 shows the operating profile of a state of the art system on a cooler October day, while FIGS. 7 and 8 show an identical system using our invention on that same day with reliability X-Factors of 1.0 and 0.95.

These operating profiles contrast the weather and system temperatures as well as operating modes of a state of the art system versus a system utilizing direct X-Factor control on an hourly basis for an October day in St. Louis, Mo. The column "Outdoor Temperature" shows the forecasted temperature (identical to real in these examples) for each hour of the day. The column "Supply Temperature" shows the assigned Supply Temperature Set Point (identical to actual in these examples) for each hour of the day. The column "Interval X-Factor" shows the X-Factor that corresponds to that hour's Supply Temperature. The column "DX Enabled" shows the status of the HVAC system's compressor. When a row is marked with a '1,' this means that the compressor is running during the corresponding hour. When a row is blank, this means that the IT space is being cooled with the compressor completely disabled.

FIG. 6 shows that a state of the art system spends the entire day running its compressor. It does this because the system cannot achieve a Supply Temperature of 68° F. (X-Factor 1) without utilizing its compressor. FIG. 7 shows that the same system can disable compressor operation for 13 hours when directly controlling to an X-Factor set point of 1 (identical reliability factor as state of the art example). Additionally, FIG. 8 shows that this system can disable compressor operation for 9 hours when directly controlling to an X-Factor set point of 0.95 (superior reliability factor to the state of the art example).

It should be observed that the system controlled using prior economizing methods are unable to operate with its compressor(s) idle for even a brief time period on either day. At the same time, the control system of embodiments of the present disclosure is able to idle the compressor(s) of the HVAC system for significant time periods on both days while supporting the same level or better of equipment reliability.

Embodiments of the systems and methods disclosed herein may include operating according to a fixed temperature set point to maintain equipment reliability. Moreover, the addition of a few more operating parameters may benefit operators of the control system in the form of reduced energy costs. For example, additional control system metrics could inform the software of the control system to make smarter decisions about how "hard" to drive compressors to make up for the warmer supply temperatures during certain economization periods. These metrics may bias operation towards fewer economization periods in order to save energy during DX operation. Moreover, information about peak demand electricity costs versus off-peak demand costs could inform the software of the control system enough to refine operating profiles according to actual cost of energy. Additionally, the addition of an automatic seasonal shift in reliability factor (lower supply temperatures in cold months, higher supply temperatures in warm months) could allow customers to save further energy by essentially capturing cheaper X-Factor offsets in winter months and applying them to more expensive summer months.

Various aspects and functions described herein, including the simulation-based optimization methodology discussed above, may be included as specialized hardware or software components executing in one or more computer systems. For example, the computer system and/or one or more acts of the method described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 9:
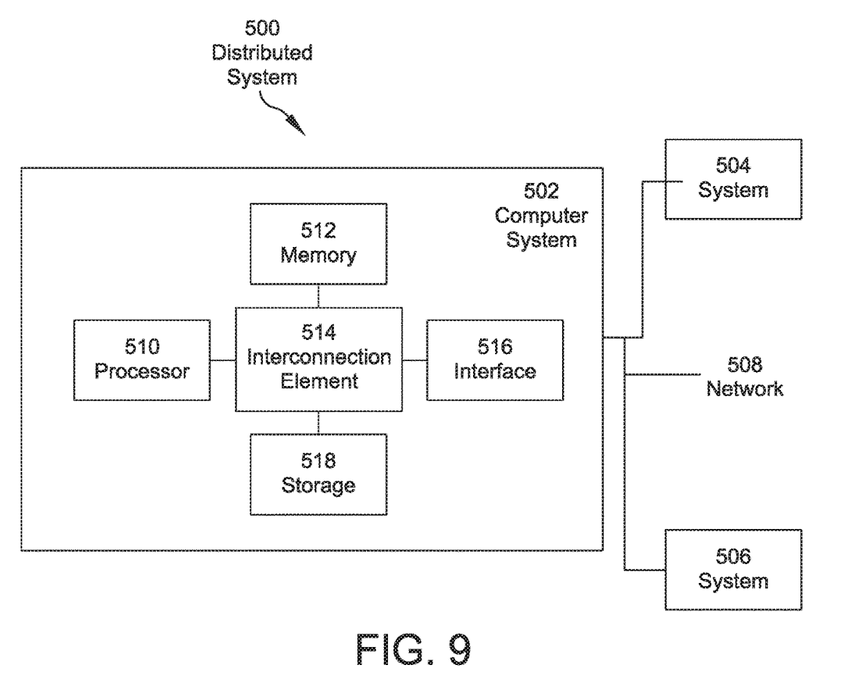
FIG. 9 is a block diagram of one example of a computer system that may be used to perform methods and functions disclosed herein.

Referring to FIG. 9, there is illustrated a block diagram of a distributed computer system 500, in which various aspects and functions are practiced. As shown, the distributed computer system 500 includes one or more computer systems that exchange information. More specifically, the distributed computer system 500 includes computer systems/devices 502, 504 and 506. As shown, the computer systems/devices 502, 504 and 506 are interconnected by, and may exchange data through, a communication network 508. The network 508 may include any communication network through which computer systems may exchange data. To exchange data using the network 508, the computer systems/devices 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 9, the computer system 502 includes a processor 510, a memory 512, an interconnection element 514, an interface 516 and data storage element 518. To implement at least some of the aspects, functions and processes disclosed herein, the processor 510 performs a series of instructions that result in manipulated data. The processor 510 may be any type of processor, multiprocessor or computer system. Some example processors include commercially available processors such as an Intel Atom, Itanium, Core, Celeron, or Pentium processor, an AMD Opteron processor, an Apple A4 or A5 processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical busses, for example, busses between components that are integrated within a same machine, but may include any communication coupling between system elements including specialized or standard computing bus technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other computer system causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502. Various aspects and functions may be practiced on one or more computers having a different architectures or components than that shown in FIG. 9. For instance, the computer system 502 may include specially programmed, special-purpose hardware, such as an application-specific integrated circuit ("ASIC") tailored to perform a particular operation disclosed herein. While another example may perform the same function using a grid of several general-purpose computing devices running MAC OS X with IBM PowerPC processors and several specialized computing devices running proprietary hardware and operating systems.

The computer system 502 may be a computer system including an operating system that manages at least a portion of the hardware elements included in the computer system 502. In some examples, a processor or computer system, such as the processor 510, executes an operating system. Examples of a particular operating system that may be executed include a Windows-based operating system, such as the Windows 8 operating system, available from the Microsoft Corporation, a MAC OS X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

While exemplary embodiments have been disclosed, many modifications, additions, and deletions may be made therein without departing from the spirit and scope of the disclosure and its equivalents, as set forth in the following claims.

What is claimed is:

1. A method of minimizing use of a compressor in an HVAC system for an IT space, the method comprises:
configuring an HVAC system to cool an IT space;
providing a control system to operate the HVAC system, the control system having software configured to forecast a minimum achievable X-Factor during an economization mode for a future portion of a predetermined period of time along with tracking cumulative X-Factor for a past portion of the predetermined period of time, thereby identifying future time that must be augmented with compressor operation to achieve user selected X-Factor in aggregate over the predetermined period of time, the predetermined period of time having user selected start date, and user selected duration having an end date in the future;
providing at least one parameter to the control system, the at least one parameter including X-Factor history and period weather forecast(s);
setting temperature set points for each forecast interval;
analyzing the temperature set points according to maximum and minimum temperature parameters for the IT space, wherein first intervals which have set points which exceed the maximum temperature parameter are designated as intervals for which the compressor will operate, and wherein second intervals which have set points below the minimum temperature parameter are assigned the minimum temperature set point; and activating the compressor during the first intervals which have set points which exceed the maximum temperature parameter.

2. The method of claim 1, wherein once minimum and maximum parameters have been satisfied, the system calculates the X-Factor for the period, using historic temperatures of the IT space if they exist, and should this X-Factor not be achievable after this adjustment, the interval with the highest temperature set point is added to the group of intervals which will operate the compressor and the adjustment attempted again.

3. The method of claim 2, wherein if the X-Factor requires upward adjustment, the software adjusts the temperature of the economizing intervals upward, starting with the interval with the coldest temperature set point until the X-Factor set point is achieved.

4. The method of claim 3, wherein the HVAC system is controlled using prior economizing methods that are unable to operate with its compressor(s) idle for even a brief time period on either day.

5. The method of claim 3, wherein the HVAC system is able to idle its compressor(s) for significant time periods on both days while supporting the same level or better of equipment reliability.

6. The method of claim 3, wherein the at least one parameter further includes configuring the software of the control system to make smarter decisions about how "hard" to drive compressor(s) to make up for the warmer supply temperatures during certain economization periods.

7. The method of claim 6, wherein the software includes metrics to bias operation towards fewer economization periods in order to save energy while the compressor is activated.

8. The method of claim 7, wherein information about peak demand electricity costs versus off-peak demand costs informs the software to refine operating profiles according to actual cost of energy.

9. The method of claim 6, wherein an addition of an automatic seasonal shift in reliability factor enables further energy savings by essentially capturing cheaper X-Factor offsets in winter months and applying them to more expensive summer months.

10. The method of claim 1, further comprising continuously monitoring and reporting measured parameters to the software of the control system.

11. The method of claim 1, further comprising setting the X-Factor.

12. The method of claim 11, wherein the IT space includes a plurality of equipment racks configured to support electronic equipment, and wherein the HVAC system includes thermistors secured to plurality of equipment racks, which result in airflow measurements being tolerant of dispersed IT populations, highly-variable IT airflow rates, and airflow direction.

13. A system to minimize use of a compressor in an HVAC system for an IT space, the system comprises:
an HVAC system configured to cool an IT space; and
a control system coupled to components of the HVAC system to operate the HVAC system, the control system having software configured to forecast a minimum achievable X-Factor during an economization mode for a future portion of a predetermined period of time along with tracking cumulative X-Factor for a past portion of the predetermined period of time, thereby identifying future time that must be augmented with compressor operation to achieve user selected X-Factor in aggregate over the predetermined period of time, the predetermined period of time having user selected start date, and user selected duration having an end date in the future, the control system being configured to
set an X-Factor,
receive at least one parameter, the at least one parameter including X-Factor history and period weather forecast(s),
set temperature set points for each forecast interval,
analyze the temperature set points and normalizing the set points according to maximum and minimum temperature parameters for the IT space, wherein first intervals which have set points which exceed the maximum temperature parameter are designated as intervals for which the compressor will operate, and wherein second intervals which have set points below the minimum temperature parameter are assigned the minimum temperature set point, and
activate the compressor during the first intervals which have set points which exceed the maximum temperature parameter.

14. The system of claim 13, wherein once minimum and maximum parameters have been satisfied, the system calculates the X-Factor for the period, using historic temperatures of the IT space if they exist, and should this X-Factor not be achievable after this adjustment, the interval with the highest temperature set point is added to the group of intervals which will operate the compressor and the adjustment attempted again, and if the X-Factor requires upward adjustment, the software adjusts the temperature of the economizing intervals upward, starting with the interval with the coldest temperature set point until the X-Factor set point is achieved.

15. The system of claim 14, wherein the HVAC system is controlled using prior economizing methods that are unable to operate with its compressor(s) idle for even a brief time period on either day, the HVAC system being able to idle its compressor(s) for significant time periods on both days while supporting the same level or better of equipment reliability.

16. The system of claim 14, wherein the at least one parameter further includes configuring the software of the control system to make smarter decisions about how "hard" to drive compressor(s) to make up for the warmer supply temperatures during certain economization periods.

17. The system of claim 16, wherein the software includes metrics to bias operation towards fewer economization periods in order to save energy while the compressor is activated.

18. The system of claim 17, wherein information about peak demand electricity costs versus off-peak demand costs informs the software to refine operating profiles according to actual cost of energy.

19. The system of claim 16, wherein an addition of an automatic seasonal shift in reliability factor enables further energy savings by essentially capturing cheaper X-Factor offsets in winter months and applying them to more expensive summer months.

20. The system of claim 13, further comprising continuously monitoring and reporting measured parameters to the software of the control system, the measure parameters including at least one of temperature, power consumption, and HVAC system specification data.

* * * * *